(12) United States Patent
Wade (10) Patent No.: US 12,294,317 B2
(45) Date of Patent: May 6, 2025

(54) PIEZOELECTRIC ULTRASONIC MOTOR WITH A MORE STABLE VIBRATION BODY

(71) Applicant: New Shicoh Motor Co., Ltd., Zhejiang (CN)

(72) Inventor: Tatsuki Wade, Yamato (JP)

(73) Assignee: New Shicoh Motor Co. LTD, Zhejiang (CN)

( * ) Notice: Subject to any disclaimer, the term of this patent is extended or adjusted under 35 U.S.C. 154(b) by 237 days.

(21) Appl. No.: 18/172,033

(22) Filed: Feb. 21, 2023

(65) Prior Publication Data

US 2023/0268850 A1 Aug. 24, 2023

(30) Foreign Application Priority Data

Feb. 22, 2022 (CN) .......................... 202210161417.0

(51) Int. Cl.
 *H02N 2/16* (2006.01)
 *H02N 2/02* (2006.01)
 *H02N 2/04* (2006.01)

(52) U.S. Cl.
 CPC ............. *H02N 2/163* (2013.01); *H02N 2/026* (2013.01); *H02N 2/046* (2013.01)

(58) Field of Classification Search
 CPC ........ H02N 2/163; H02N 2/026; H02N 2/046; H02N 2/001; H02N 2/0085; H02N 2/06; H02N 2/02; G02B 13/001; G02B 13/34; G02B 7/08; G02B 7/04
 See application file for complete search history.

(56) References Cited

U.S. PATENT DOCUMENTS 6,747,394 B2 * 6/2004 Johansson .............. H02N 2/026
 310/332

FOREIGN PATENT DOCUMENTS

JP 2007-49895 A 2/2007

* cited by examiner

*Primary Examiner* — Emily P Pham
(74) *Attorney, Agent, or Firm* — Hayes Soloway P.C.

(57) ABSTRACT

A piezoelectric ultrasonic motor including: a columnar body having two opposite bottom surface portions and a plurality of side surface portions surrounding a region between the two bottom surface portions, and having a through hole that penetrates between the two bottom surface portions; a driving shaft inserted through the through hole of the columnar body; and a flexible printed circuits (FPC) on which a plurality of sheet-like piezoelectric elements are mounted, wherein the FPC has an FPC main body bringing the plurality of piezoelectric elements into contact respectively with the plurality of side surface portions of the columnar body and wound around the columnar body, and can supply driving electric power to the plurality of piezoelectric elements.

10 Claims, 6 Drawing Sheets

PIEZOELECTRIC ULTRASONIC MOTOR WITH A MORE STABLE VIBRATION BODY

CROSS-REFERENCE TO RELATED APPLICATIONS

This application claims the benefit of Chinese Patent Application No. 202210161417.0 filed, Feb. 22, 2022, which is hereby incorporated by reference herein in its entirety.

TECHNICAL FIELD

The present disclosure relates to a piezoelectric ultrasonic motor, and an optical member driving device, a camera device and an electronic apparatus using the piezoelectric ultrasonic motor.

BACKGROUND

A piezoelectric ultrasonic motor is composed of a columnar body having a through hole and a driving shaft inserted through this through hole, and a plurality of piezoelectric elements attached to the side surface portion of this columnar body. This type of piezoelectric ultrasonic motor is disclosed, for example, in Japanese Patent Application Laid-Open No. 2007-49895 (hereinafter referred to as "Patent Document 1").

With the recent rapid development of IT industry, there is an increasing demand for ultra-compact camera modules for mounting on smartphones or the like. In a camera module, a voice coil motor or a piezoelectric ultrasonic motor can be used as a driving mechanism for an optical member such as a lens body. In particular, the piezoelectric ultrasonic motor has advantages of fast response speed, reverse driving prevention function and high transfer resolution. Therefore, the piezoelectric ultrasonic motor is expected as the driving mechanism for the optical member used in the ultra-compact camera modules.

SUMMARY

By the way, in the piezoelectric ultrasonic motor disclosed in Patent Document 1, driving electric power from an external power source is given to the piezoelectric elements mounted on a metal tube via connecting terminals. Therefore, in Patent Document 1, a detachment prevention holder surrounding the outer surface of the piezoelectric elements and the connecting terminals has been provided in order to prevent the connecting terminals from being separated from the piezoelectric elements, In this case, in the piezoelectric ultrasonic motor, there was a problem where the detachment prevention holder interferes with the movement of the vibration body composed of the piezoelectric elements and the metal tube.

The present disclosure has been made in view of such problem, and the present disclosure aims to provide a piezoelectric ultrasonic motor in which the movement of a vibration body can be hardly interfered with, and an optical member driving device, a camera device and an electronic apparatus using the piezoelectric ultrasonic motor.

To achieve the above-described objects, in accordance with a first aspect of the present disclosure, there is provided a piezoelectric ultrasonic motor including: a columnar body having two opposite bottom surface portions and a plurality of side surface portions surrounding a region between the two bottom surface portions, and having a through hole that penetrates between the two bottom surface portions; a driving shaft inserted through the through hole of the columnar body; and a flexible printed circuits (FPC) on which a plurality of sheet-like piezoelectric elements are mounted, wherein the FPC has an FPC main body bringing the plurality of piezoelectric elements into contact respectively with the plurality of side surface portions of the columnar body and is wound around the columnar body, and can supply driving electric power to the plurality of piezoelectric elements.

In accordance with a second aspect of the present disclosure, there is provided an optical member driving device having a carrier that supports the optical member, and the piezoelectric ultrasonic motor described above wherein the carrier is driven by the piezoelectric ultrasonic motor described above as a driving source for the carrier.

In accordance with a third aspect of the present disclosure, there is provided a camera device including the optical member driving device described above.

In accordance with a fourth aspect of the present disclosure, there is provided an electronic apparatus including the camera device described above.

Further features of the present invention will become apparent from the following description of exemplary embodiments (with reference to the attached drawings).

DETAILED DESCRIPTION

Figure 1:
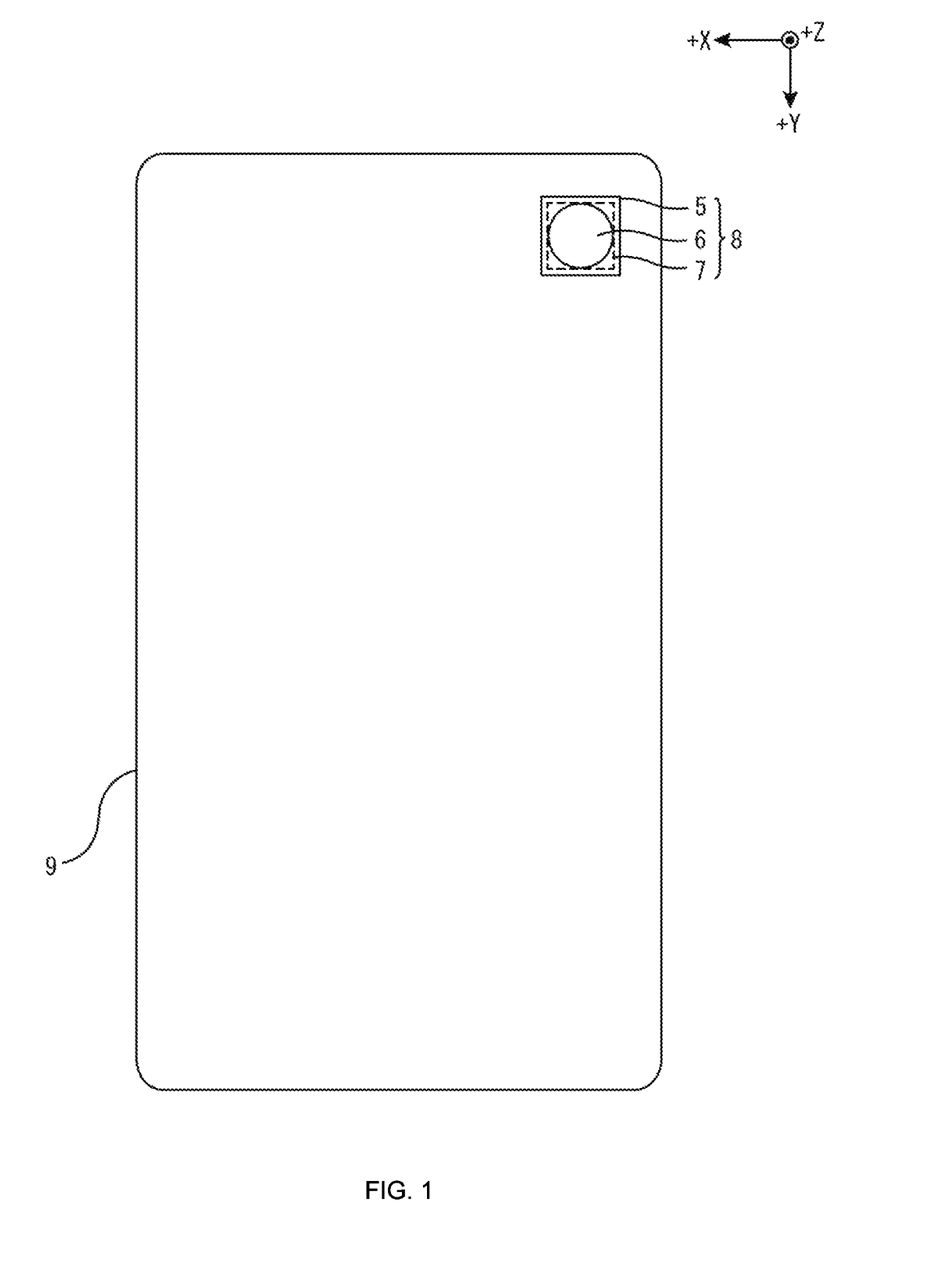
FIG. 1 is a front view of a smartphone 9 on which a camera device 8 including an optical member driving device 5 using a piezoelectric ultrasonic motor 100 according to one embodiment of the present disclosure is mounted.

As shown in FIG. 1, a camera device 8 including an optical member driving device 5 using a piezoelectric ultrasonic motor 100 (hereinafter, simply referred to as motor 100 (see FIG. 5)) according to one embodiment of the present disclosure is accommodated in a housing of a smartphone 9.

The camera device 8 has a lens body 6, an image sensor 7, and an optical member driving device 5 driving the lens body 6. The image sensor 7 converts light incident via the lens body 6 into an image signal and outputs the image signal. The optical member driving device 5 drives the lens body 6 along a direction parallel to an optical axis thereof by the motor 100.

As shown in FIGS. 1 through 6, a configuration of the optical member driving device 5 is described below, assuming an XYZ orthogonal coordinate system consisting of a Z axis parallel to the optical axis of the lens body 6 and an X axis and an Y axis orthogonal to each other and orthogonal to the Z axis. Also, in the following, when viewed from the lens body 6, the side of the subject may be referred to as a +Z side, and the opposite side (image sensor 7 side) may be referred to as a −Z side.

Figure 2:
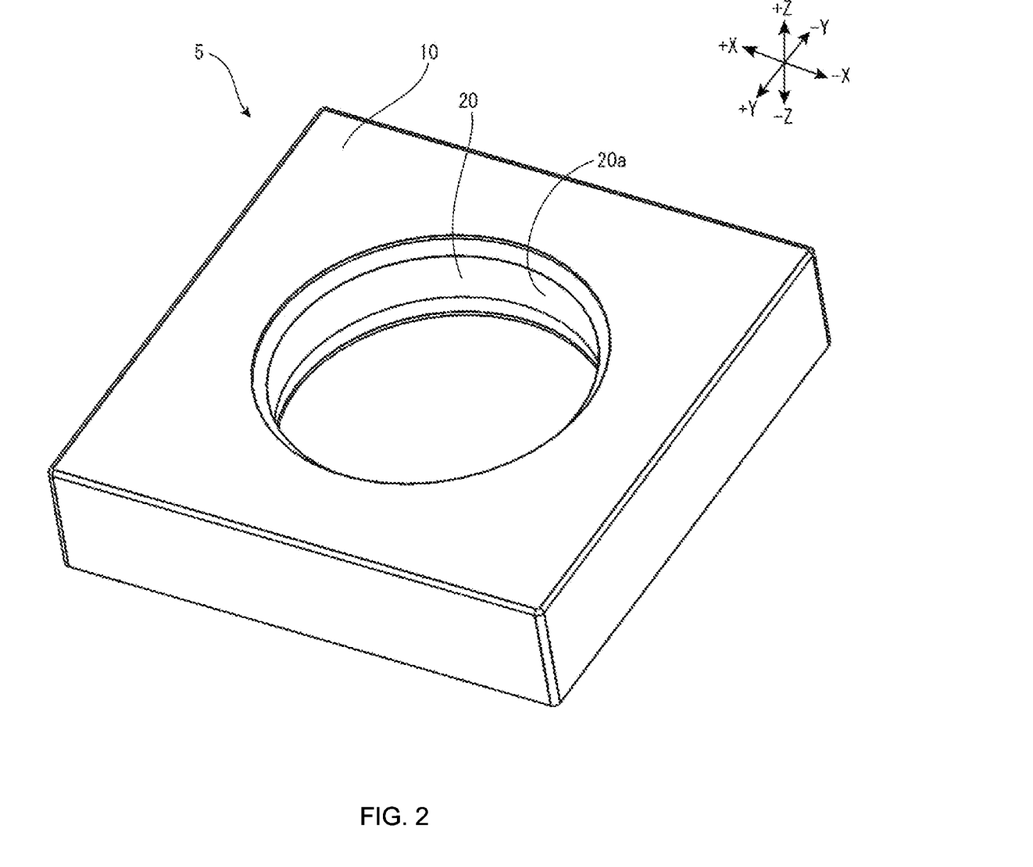
FIG. 2 is a perspective view of the optical member driving device 5 shown in FIG. 1.

As shown in FIG. 2, the optical member driving device 5 accommodates a carrier 20 having a hole 20a for supporting the lens body 6 in a rectangular parallelepiped shaped case 10. The light from the subject passes through the center of the optical member driving device 5.

Figure 3:
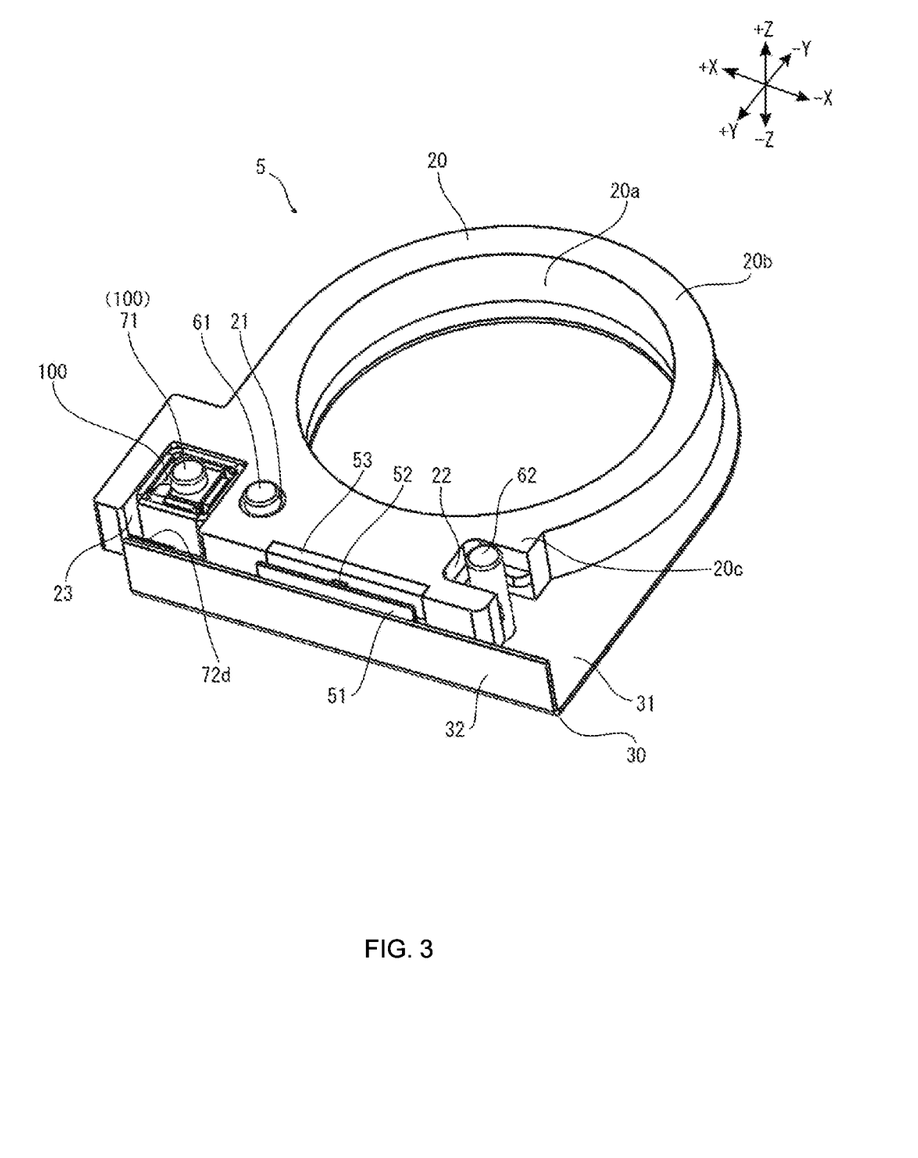
FIG. 3 is a perspective view of the optical member driving device 5 with a case 10 shown in FIG. 2 removed.

As shown in FIG. 3, the carrier 20 is arranged on the base 30. The base 30 has a bottom surface portion 31 which is a plate-like metal member expanding in the XY direction, and a side surface portion 32 bent at a right angle to the +Z side at an end portion on the +Y side of the bottom surface portion 31. The carrier 20 is arranged on the +Z side of the bottom surface portion 31 of the base 30. The carrier 20 has a shape that integrates an annular portion 20b formed around the hole 20a for accommodating the lens body 6 and an approximately rectangular parallelepiped shaped connecting portion 20c provided on the +Y side of the annular portion 20b so as to face the side surface portion 32 of the base 30.

Figure 4:
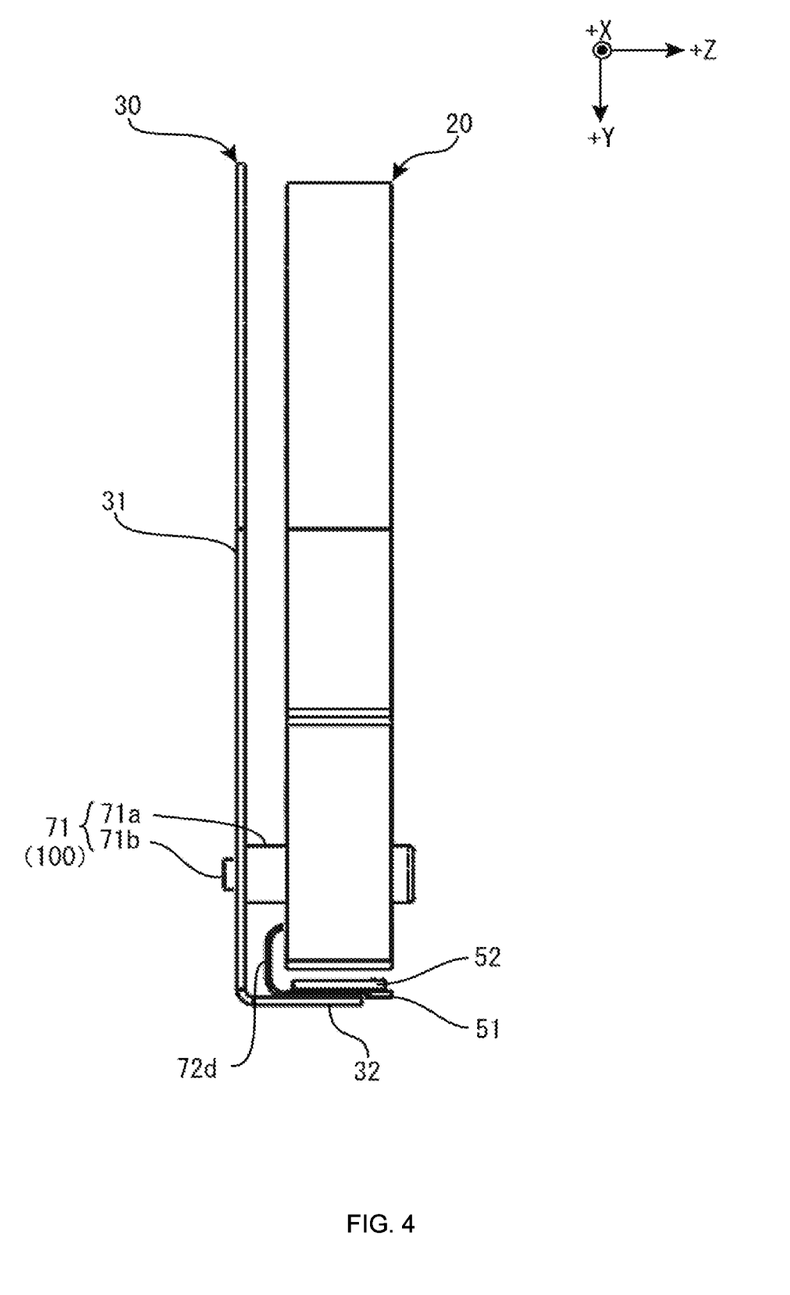
FIG. 4 is a side view of a carrier 20 and a base 30 of the optical member driving device 5.

Near the side surface portion 32 at the bottom surface portion 31 of the base 30, a main guide shaft 61 and a sub guide shaft 62 are aligned at predetermined intervals in the X axis direction and are erected so that their proximal end portions are fixed to the bottom surface portion 31 and their center axes are substantially parallel to the +Z axis, respectively. A hole 21 and a notch portion 22 are formed in the connecting portion 20c of the carrier 20. The main guide shaft 61 and the sub guide shaft 62 are respectively accommodated in the hole 21 and the notch portion 22, and guide the carrier 20 to move in the Z axis direction. In addition, a notch portion 23 is formed on the end surface of the +Y side of the carrier 20, and the motor 100 is accommodated in this notch portion 23. As described later, the motor 100 has a driving shaft 71, and as shown in FIG. 4, the driving shaft 71 has a proximal end portion 71b which is fixed to the bottom surface portion 31 of the base 30 and is erected toward the +Z side. The optical member driving device 5 uses the motor 100 according to the present embodiment as a driving source and drives the carrier 20 in the Z axis direction with respect to the base 30.

As shown in FIG. 3, a yoke 51 and a Hall IC 52 are arranged on the −Y side surface of the side surface portion 32 of the base 30. A magnet 53 is arranged on a surface opposite to the side surface portion 32 of the carrier 20. The Hall IC 52 detects the position of the carrier 20 in the Z axis direction by detecting the magnetic field of the magnet 53. The yoke 51 and the magnet 53 are attracted to each other, and the carrier 20 is attracted to the side surface portion 32. As a result, the inner wall of the hole 21 and the inner wall of the notch portion 22 of the carrier 20 are pressed against the periphery of the main guide shaft 61 and the sub guide shaft 62 with a moderate pressure, and the attitude of the carrier 20 and the driving in the Z axis direction are stabilized.

As shown in FIG. 4, the motor 100 accommodated in the carrier 20 has a driving shaft 71 extending in the Z axis direction. The driving shaft 71 has a proximal end portion 71b on the −Z side of the driving shaft 71 having a smaller diameter than the driving shaft main body portion 71a of the driving shaft 71, and the proximal end portion 71b, which is a portion with a smaller diameter, is inserted in to a hole formed in the bottom surface portion 31 and is fixed by a method such as caulking or welding. The main guide shaft 61 and the sub guide shaft 62 have a similar structure and are fixed by a similar method. In addition, as shown in FIGS. 4 and 5, in the motor 100, a drawn-out portion 72d of the FPC (Flexible Printed Circuits) 72 is drawn out from a FPC main body 72a in a direction parallel to a center axis of the driving shaft 71, bent 180 degrees in the opposite direction, and arranged and fixed on a surface on the −Y side of the side surface portion 32, and further electrically connected to the outside of the optical member driving device 5.

Figure 5:
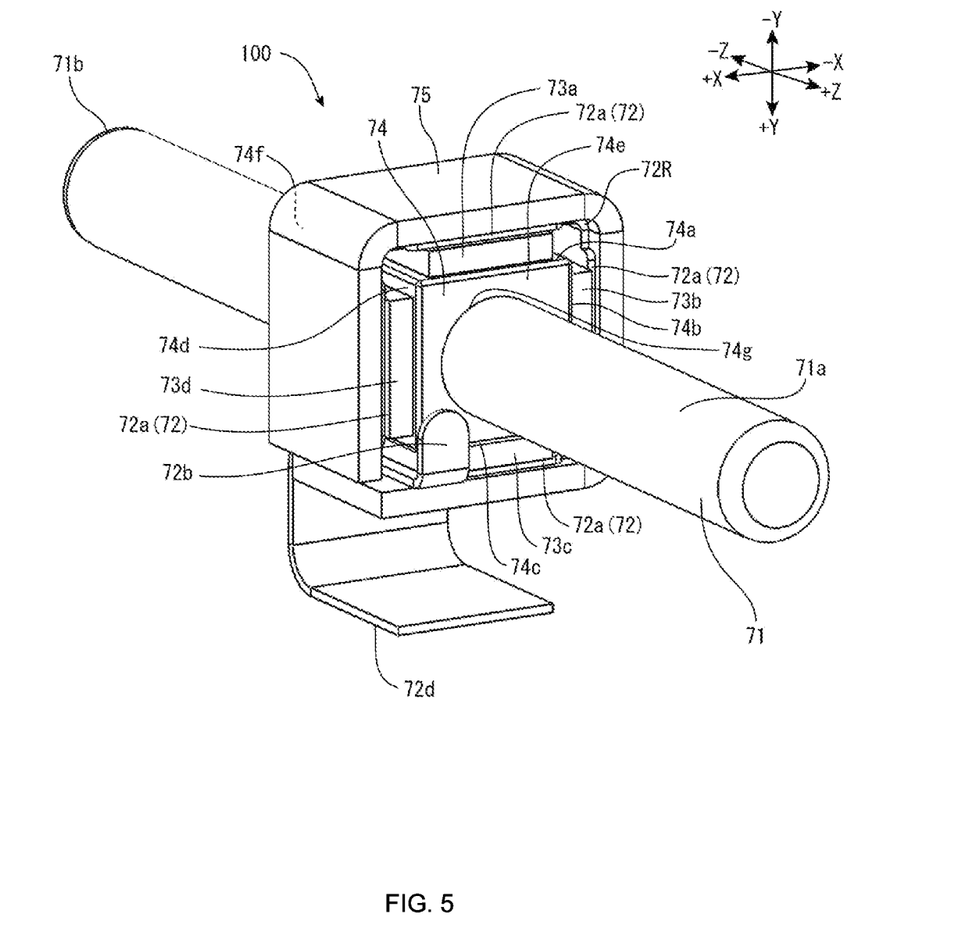
FIG. 5 is a perspective view of the piezoelectric ultrasonic motor 100 of the optical member driving device 5.
Figure 6:
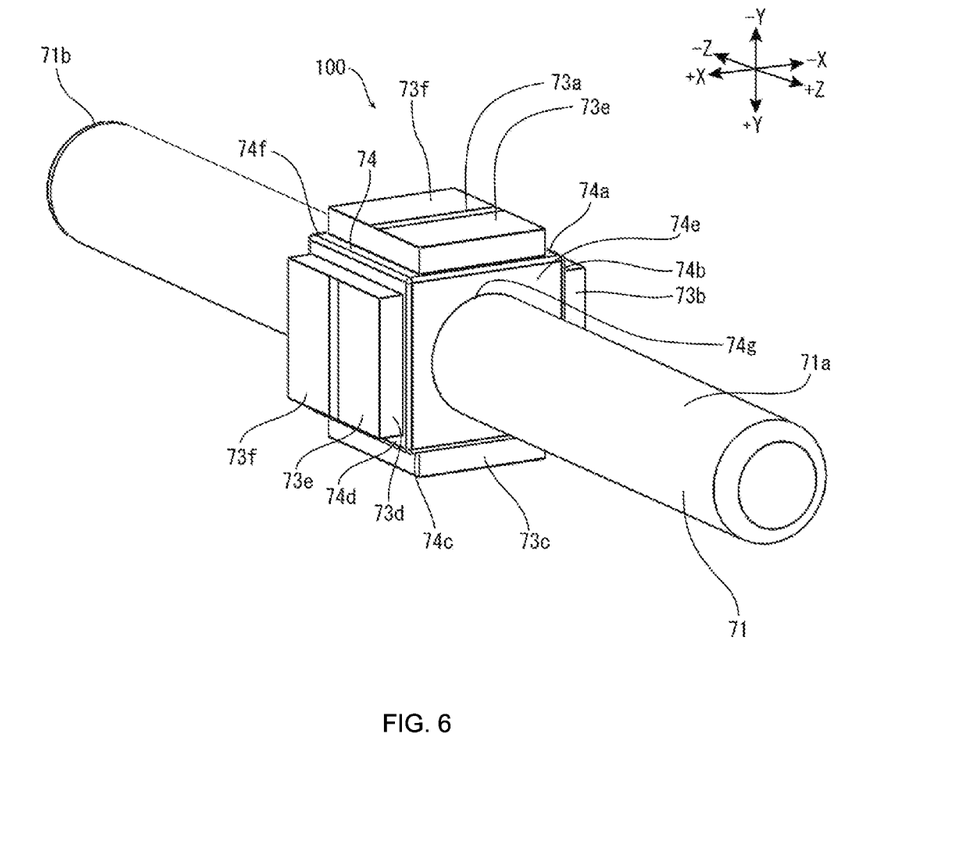
FIG. 6 is a perspective view in which a felt 75 and a FPC (Flexible Printed Circuits) 72 are removed from the piezoelectric ultrasonic motor 100 shown in FIG. 5.

As shown in FIG. 5 and FIG. 6, the motor 100 has a metal columnar body 74. In the present embodiment, the columnar body 74 is a quadrangular prism having two opposite bottom surface portions 74e and 74f and side surface portions 74a, 74b, 74c and 74d surrounding the region between these two bottom surface portions 74e and 74f. Further, the columnar body 74 has a through hole 74g penetrating between the two bottom surface portions 74e and 74f. The driving shaft 71 is inserted through the through hole 74g of the columnar body 74.

The FPC main body 72a of the FPC 72 is equipped with a plurality of (four in the example shown in FIG. 5) sheet-like piezoelectric elements 73a, 73b, 73c and 73d. The main body 72a brings the plurality of piezoelectric elements 73a, 73b, 73c and 73d into contact with the corresponding side surface portions 74a, 74b, 74c and 74d of the columnar body 74 one by one, and is wound around the columnar body 74 from the outside of the piezoelectric elements 73a, 73b, 73c and 73d. On the surface of each of the piezoelectric elements 73a, 73b, 73c and 73d, an electrode 73e is formed on the +Z side, and an electrode 73f is formed on the −Z side to be separated from the electrode 73e. The electrode 73e, 73f are electrically connected to the FPC 72, respectively. An electrode is also formed on the back surface on the opposite side of the surface of each of the piezoelectric elements 73a, 73b, 73c and 73d, and is electrically connected to the columnar body 74. FPC 72 has a common terminal portion 72b and is electrically connected to the bottom surface portion 74e of the columnar body 74. The FPC 72 can supply driving power to the plurality of piezoelectric elements 73a, 73b, 73c and 73d.

In addition, the FPC main body 72a is wound around the columnar body 74 in an order of side surface portions 74c, 74b, 74a, and 74d of the columnar body 74 from the drawn-out portion 72d shown in FIG. 5. The FPC main body 72a has an R portion (a rounded portion) 72R at each position opposite to each of the corner portions between the four side surface portions 74a, 74b, 74c and 74d, excluding the corner portion between the side surface portion 74c and the side surface portion 74d of the columnar body 74. The width of the R portion (a rounded portion) 72R in the Z direction is about the same as the width of its adjacent portion. In addition, the outer surface of the FPC main body 72a wound around the columnar body 74 is covered with the felt 75, which is a buffer material. The motor 100 covered with the felt 75 is fixed to the inner walls of the −X side, −Y side, and +X side within the notch portion 23 of the carrier 20 as shown in FIG. 3.

In the above configuration, a voltage of the same frequency, the same phase and the same height is applied to each of the electrodes 73e of the piezoelectric elements 73a, 73b, 73c and 73d, and a voltage of the same frequency, a phase difference of 90 degrees, and the same height with respect to the voltage applied to the electrode 73e is applied to each of the electrodes 73f. This causes the piezoelectric elements 73a, 73b, 73c and 73d at positions corresponding to the respective electrodes 73e and 74f expand and contract in the directions of their plate surfaces, respectively. Since the columnar body 74 does not expand or contract like that, the piezoelectric elements 73a, 73b, 73c and 73d corresponding to the respective electrodes 73e and 73f and the portion up to the through hole 74g of the columnar body 74 have a deformation that repeats a bowl-like shape and its inverted shape as a whole, respectively, assuming that this portion is a flat plate. That is, the inner wall surface of the through hole 74g at the position corresponding to each electrode 73e and 73f has a deformation that repeats a bowl-like shape and its inverted shape as a whole, respectively, assuming that the inner wall surface is flat. Thus, the piezoelectric elements 73a, 73b, 73c and 73d and the columnar body 74 constitute a vibration body. Since the voltage applied to the electrode 73e and the voltage applied to the electrode 73f have a phase difference of 90 degrees, the deformation of the inner wall surface of the through hole 74g at the position corresponding the electrode 73e and the deformation of the inner wall surface of the through hole 74g at the position corresponding to the electrode 73e also have a phase difference of 90 degrees. Herewith, the inner wall surface of the through hole 74g makes an elliptical motion along the axial direction of the through hole 74g, and the columnar body 74 moves in the +Z direction or the −Z direction along the driving shaft 71. The moving direction of this columnar body 74 can be controlled by changing the phase difference of the applied voltage.

In the present embodiment, the carrier 20 is fixed to the columnar body 74 as described above Therefore, according to the present embodiment, the carrier 20 can be moved in the Z axis direction with respect to the base 30 by supplying driving power from the FPC 72 to the piezoelectric elements 73a, 73b, 73c and 73d.

The above are the details of the configuration of the present embodiment. The piezoelectric ultrasonic motor 100 in the present embodiment has a columnar body 74, a driving shaft 71, and an FPC 72 on which a plurality of sheet-like piezoelectric elements 73a, 73b, 73c and 73d are mounted. The columnar body 74 has two opposite bottom surface portions 74e and 74f and side surface portions 74a, 74b, 74c and 74d surrounding the region between these two bottom surface portions 74e and 74f, and has a through hole 74g penetrating between the two bottom surface portions 74e and 74f. The driving shaft 71 is inserted through the through hole 74g of the columnar body 74. The FPC 72 has an FPC main body 72a bringing a plurality of piezoelectric elements 73a, 73b, 73c and 73d into contact with the side surface portions 74a, 74b, 74c and 74d of the columnar body 74 and is wound around the columnar body 74, and can supply driving power to the plurality of piezoelectric elements 73a, 73b, 73c and 73d. In this configuration, since the FPC main body 72a brings the plurality of piezoelectric elements 73a, 73b, 73c and 73d into contact with the side surface portions 74a, 74b, 74c and 74d of the columnar body 74 and is wound around the columnar body 74, and the FPC 72 can supply driving power to the plurality of piezoelectric elements 73a, 73b, 73c and 73d, it hardly interferes with the movement of the piezoelectric elements 73a, 73b, 73c and 73d and the columnar body 74 constituting the vibration body. Therefore, in the piezoelectric ultrasonic motor 100 of the present embodiment, the movement of the vibration body is hardly interfered with.

It is to be noted that, the columnar body 74 is a quadrangular prism with four side surface portions, but it is not limited thereto, and may be a triangular prism, a hexagonal prism, etc., and as long as it is feasible including a piezoelectric element, etc., it also may be a cylinder. Further, in the present embodiment, the piezoelectric ultrasonic motor 100 is configured such that the driving shaft 71 is fixed and the columnar body 74 moves, but it may be configured such that the columnar body 74 is fixed and the driving shaft 71 moves. The buffer material used as the felt 75 does not need to be a felt, and may be a material that can hold the piezoelectric ultrasonic motor 100 and does not interferes with the vibration of the vibration body. Further, in the optical member driving device 5, the piezoelectric ultrasonic motor 100 may be provided so as to drive the carrier 20 in a direction orthogonal to the optical axis of the lens body 6. Further, in the optical member driving device 5, the piezoelectric ultrasonic motor 100 may be provided so as to drive other optical members such as the image sensor 7, optical prism, shutter, etc. instead of the lens body 6.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A piezoelectric ultrasonic motor, comprising:
   a columnar body having two opposite bottom surface portions and a plurality of side surface portions surrounding a region between the two opposite bottom surface portions, and having a through hole that penetrates between the two opposite bottom surface portions;
   a driving shaft inserted through the through hole of the columnar body; and
   a flexible printed circuit (FPC) on which a plurality of sheet-like piezoelectric elements elements are mounted, wherein the FPC has an FPC main body bringing the plurality of piezoelectric elements into contact respectively with the plurality of side surface portions of the columnar body and is wound around the columnar body, and can supply driving electric power to the plurality of sheet-like piezoelectric elements.

2. The piezoelectric ultrasonic motor according to claim 1, wherein the FPC main body has a rounded portion at a position opposite to a corner portion between the plurality of side surface portions of the columnar body.

3. The piezoelectric ultrasonic motor according to claim 1, wherein, the columnar body is a quadrangular prism with four side surface portions, and four piezoelectric elements in contact with the four side surface portions are mounted on the FPC.

4. The piezoelectric ultrasonic motor according to claim 1, comprising a buffer material covering an outer surface of the FPC main body.

5. The piezoelectric ultrasonic motor according to claim 1, wherein, the FPC has a drawn-out portion which is drawn out parallel to a center axis of the driving shaft from the FPC main body and curved 180 degrees in an opposite direction.

6. The piezoelectric ultrasonic motor according to claim 1, wherein, two electrodes are provided adjacently to each piezoelectric element in a direction where the through hole penetrates, and voltages of different phases are applied to respective electrodes.

7. The piezoelectric ultrasonic motor according to claim 1, wherein, the FPC has a common terminal portion electrically connected to the columnar body.

8. An optical member driving device comprising a carrier that supports an optical member, and the piezoelectric ultrasonic motor according to claim 1, wherein the carrier is driven by the piezoelectric ultrasonic motor.

9. A camera device comprising the optical member driving device according to claim 8.

10. An electronic apparatus comprising the camera device according to claim 9.

\* \* \* \* \*